(12) United States Patent
Jones et al.

(10) Patent No.: US 9,670,980 B2
(45) Date of Patent: Jun. 6, 2017

(54) ENERGY ABSORBER AND FALL ARREST SYSTEM SAFETY DEVICE

(71) Applicant: Latchways PLC, Wiltshire (GB)

(72) Inventors: Owain Jones, Wiltshire (GB); Karl Jones, Wiltshire (GB)

(73) Assignee: Latchways PLC, Devizes (GB)

( * ) Notice: Subject to any disclaimer, the term of this patent is extended or adjusted under 35 U.S.C. 154(b) by 0 days.

(21) Appl. No.: 14/352,859

(22) PCT Filed: Oct. 29, 2012

(86) PCT No.: PCT/GB2012/052681
§ 371 (c)(1),
(2) Date: Apr. 18, 2014

(87) PCT Pub. No.: WO2013/061087
PCT Pub. Date: May 2, 2013

(65) Prior Publication Data
US 2014/0251731 A1    Sep. 11, 2014

(30) Foreign Application Priority Data

Oct. 27, 2011   (GB) .................................... 1118597.2
Jul. 23, 2012   (GB) .................................... 1213064.7

(51) Int. Cl.
*F16F 7/08*     (2006.01)
*A62B 35/04*    (2006.01)
(Continued)

(52) U.S. Cl.
CPC .......... *F16F 7/087* (2013.01); *A62B 35/0068* (2013.01); *A62B 35/04* (2013.01); *E04G 21/3204* (2013.01); *E04G 21/329* (2013.01)

(58) Field of Classification Search
CPC .......... F16F 7/087; F16D 59/00; A62B 35/00; A62B 35/04; A62B 35/0068; A62B 1/06;
(Continued)

(56) References Cited

U.S. PATENT DOCUMENTS 3,760,910 A  *  9/1973  Koshihara .................... 188/180
3,802,540 A  *  4/1974  Preston et al. ........... 192/12 BA
(Continued)

FOREIGN PATENT DOCUMENTS

DE      102010012377 A1     9/2011
WO      WO 9306384 A1       4/1993
(Continued)

*Primary Examiner* — Katherine Mitchell
*Assistant Examiner* — Shiref Mekhaeil
(74) *Attorney, Agent, or Firm* — Gordon & Jacobson, P.C.

(57) ABSTRACT

A safety device for use in a fall arrest or fall safety system includes an energy absorber to absorb energy in the event of a fall or other impulse event. The energy absorber is a resilient element (such as a tolerance ring) providing an interference fit between a first component of the device and a second component of the device. In the event of a fall arrestor other impulse event, the first and second components effect movement relative to one another, the interference fit being overcome, and the resilient element/tolerance ring acting to resist the relative movement thereby absorbing energy.

11 Claims, 11 Drawing Sheets

(51) Int. Cl.
  *A62B 35/00*  (2006.01)
  *E04G 21/32*  (2006.01)
(58) Field of Classification Search
  CPC .... A62B 1/08; A62B 1/10; A62B 1/12; E04G 21/3204; E04G 21/329
  See application file for complete search history.

(56) References Cited

U.S. PATENT DOCUMENTS

| | | | | |
|---|---|---|---|---|
| 4,511,123 | A * | 4/1985 | Ostrobrod | 254/364 |
| 4,640,388 | A * | 2/1987 | Walborn | 182/231 |
| 5,343,976 | A * | 9/1994 | Ostrobrod | 182/4 |
| 5,351,906 | A * | 10/1994 | Feathers | 242/396.6 |
| 7,281,620 | B2 * | 10/2007 | Wolner et al. | 192/223.1 |
| 7,484,696 | B2 * | 2/2009 | Kim | 248/49 |
| 8,181,744 | B2 * | 5/2012 | Parker et al. | 182/232 |
| 8,385,024 | B2 * | 2/2013 | Schmidt et al. | 360/265.6 |
| 8,485,752 | B2 * | 7/2013 | Slayne | 403/372 |
| 8,701,833 | B2 * | 4/2014 | Marquardt et al. | 182/231 |
| 8,950,551 | B2 * | 2/2015 | Jones et al. | 182/231 |
| 9,062,700 | B2 * | 6/2015 | Pennsiriwongse | |
| 9,074,637 | B2 * | 7/2015 | Slayne et al. | |
| 2002/0179372 | A1 * | 12/2002 | Schreiber et al. | 182/238 |
| 2005/0224616 | A1 * | 10/2005 | Xiaolin | 242/286 |
| 2009/0178887 | A1 * | 7/2009 | Reeves et al. | 182/239 |
| 2009/0223744 | A1 * | 9/2009 | Dowie | 182/234 |
| 2011/0076096 | A1 * | 3/2011 | Slayne et al. | 403/372 |
| 2012/0067670 | A1 * | 3/2012 | Rinklake | 182/234 |
| 2012/0118670 | A1 * | 5/2012 | Olson et al. | 182/232 |

FOREIGN PATENT DOCUMENTS

| | | |
|---|---|---|
| WO | WO 95/01815 A3 | 1/1995 |
| WO | WO 01/87420 A1 | 11/2001 |
| WO | WO 2005/079922 A1 | 9/2005 |
| WO | WO 2008/007119 A1 | 1/2008 |
| WO | WO 2009/047541 A2 | 4/2009 |
| WO | WO 2010/035127 A1 | 4/2010 |

\* cited by examiner

SECTION A-A

FIG 12D

FIG 12C

ENERGY ABSORBER AND FALL ARREST SYSTEM SAFETY DEVICE

CROSS-REFERENCE TO RELATED APPLICATIONS

This application claims priority from PCT/GB/2012/052681 filed on Oct. 29, 2012, GB 1118597.2 filed on Oct. 27, 2011, and GB 1213064.7 filed on Jul. 23, 2012, all of which are hereby incorporated by reference in their entireties.

BACKGROUND

1. Field

The present invention relates to a fall arrest system energy absorber and safety device and in particular to a device including an energy absorber arrangement to absorb the energy of a fall arrest event.

2. Related Art

Fall arrest systems are used to prevent personnel working at height from suffering injury as a result of falling. Fall arrest systems are often referred to as height safety systems or fall prevention systems. Frequently such systems utilise an energy absorber device arranged to be activated if a load above a predetermined threshold is applied. The energy absorber devices can take many forms such as fabric rip devices, friction brake devices or plastically deformable arrangements that are plastically deformed during deployment in order to absorb energy.

One type of device that relies on an energy absorber is a so called safety block arranged to be suspended overhead from an anchor structure. Such arrangements typically include a drum upon which a safety line is wound; a speed responsive mechanism arranged to inhibit the drum rotation above a predetermined rotational speed and an energy absorber device arranged to be deployed if a load above a predetermined threshold is encountered when the speed responsive mechanism is deployed. Exemplary arrangements are disclosed in WO2009/047541 and WO2008/007119.

Another species of fall arrest or fall safety device is shown in for example WO95/01815, which discloses a device for use with a lanyard, and includes an energy absorber, and is used to connect between a user's harness and an anchor point for the lanyard.

Another type of fall arrest or fall safety device is an energy absorbing anchor post such as the arrangement shown in EP1282460. The system is, for example, suitable for use in cable based fall arrest systems anchored to structures such as roofs. The cable needs to be held well clear of the roof surface to permit fall arrest system travellers to travel un-impeded along the cable. The casing of the post enables this to be achieved. A coiled plastically deformable energy absorber is disclosed in EP1282460.

An example of a further alternative embodiment of safety device for a fall protection system is shown in EP0605538. The system is, for example, suitable for use in a safety line system to absorb sudden impact loadings and absorb impulse or shock energy. The system utilises an energy absorber device as does the previous examples but in this instance absorbs energy as two components move translationally or linearly relative to one another rather than rotationally as in the previously described prior art examples. In the primary described embodiment in EP0605538 movement of a rod causes a retaining nut to be forced along a sleeve to permanently outwardly plastically deform the sleeve. The plastic deformation of the sleeve absorbs the energy.

An improved arrangement has now been devised.

SUMMARY

According to a first aspect, the present invention provides safety device for use in a fall arrest or fall safety system, the safety device comprising an energy absorber arrangement to absorb energy in the event of a fall or other impulse event, wherein the energy absorber arrangement comprises a resilient element providing an interference fit between a first component of the device and a second component of the device.

In the event of a fall or other impulse event, the first and second components preferably effect movement relative to one another, the interference fit being overcome, and the resilient element acting to resist the relative movement thereby absorbing energy.

In a first realisation the energy absorber arrangement comprises a resilient element providing interference fit between a rotational component of the device and another component of the device.

One component may comprise a rotating component which is mounted about another component of the device, such as a hub or shaft.

It is preferred that the arrangement comprises means for effecting relative rotational movement of the components between which the resilient element is positioned.

In one embodiment the relative rotational movement may be achieved by means of one or more actuator windings (for example actuator strips) wound around the components and being deployable from the wound condition to an unwound condition, in so doing effecting relative rotational movement.

In such an arrangement one end of the strip/winding is connected to the component to be rotated and the other end is pulled away to deploy the strip, in so doing causing the component to rotate. Rotation stops when the energy has been absorbed and further deployment is prevented when the strip/winding is fully deployed (unwound).

In an alternative realisation the components are arranged to move linearly or translationally when the interference fit is overcome, and the resilient element acts to resist the relative movement thereby absorbing energy.

In a preferred embodiment the resilient element comprises a tolerance ring. It is known to connect mating inner and outer components together using a tolerance ring. For example, a tolerance ring may be sandwiched between a shaft that is located in a corresponding bore formed in a housing, or it may act as a force limiter to permit torque to be transmitted between the shaft and the housing. The use of a tolerance ring accommodates minor variations in the diameter of the inner and outer components without substantially affecting their interconnection. An example of a prior art tolerance ring is disclosed in, for example, WO2010/035127.

The present invention uses the torque threshold characteristic of tolerance rings but also the inventive realisation that their nature means that tolerance rings can absorb energy and be adapted for use to do so in a fall arrest device.

According to a further aspect, the invention provides a safety device for use in a fall arrest system, the safety device comprising a safety line drum mounted for rotation on a shaft by means of a tolerance ring.

According to a further aspect, the invention provides an energy absorber for a fall arrest device, the energy absorber comprising a resilient element providing an interference fit between a rotational component of the device and another component of the device.

According to a further aspect, the invention provides an energy absorber for a fall arrest device, the energy absorber comprising a tolerance ring.

According to a further aspect, the invention provides a safety device for use in a fall arrest system, the safety device comprising:
- a safety line drum mounted for rotation;
- a speed responsive engagement mechanism responsive to the speed of rotation of the drum, which is activated, above a predetermined rotational speed of the drum;
- a tolerance ring acting as an energy absorber arrangement to absorb energy and slow the rotation of the safety line drum when the speed responsive engagement mechanism is activated.

It is therefore preferred that the energy absorber arrangement comprises a resilient element (such as a tolerance ring) providing an interference fit between a rotational component of the device and another component of the device which is mounted onto the rotational component of the device.

It is preferred that the rotational component comprises a rotational shaft.

In one embodiment it is preferred that the energy absorber arrangement comprises a resilient element providing an interference fit between a rotational shaft of the device and the safety line drum mounted on the shaft.

It is desirable that the resilient element providing an interference fit between a rotational component of the device and another component of the device, is arranged to permit relative rotational motion of the connected components when a predetermined threshold torque level is reached or attained or applied.

In one embodiment it may be preferred that a plurality of resilient elements (for example at spaced portions of a shaft) are provided to provide the interference fit between a rotational component of the device and another component of the device.

It is preferred that the resilient element is a band or ring comprising a plurality of radially extending projections.

In one embodiment the speed responsive engagement mechanism may comprise a ratchet and pawl device. The ratchet may comprise a ratchet disc or wheel and there is relative rotation between the ratchet and the pawl.

In one embodiment, one of the ratchet or pawl may be coupled to rotate with a shaft upon which the drum is mounted.

It is preferred that the device further comprises a re-winding or re-spooling mechanism to rotate the drum to re-wind the safety line onto the drum in the absence of sufficient tension in the safety line to pay out the line.

In an alternative embodiment a safety device according to the first aspect of the invention, includes a wound store of elongate deployable material; wherein the wound material is deployed to an unwound state when a force is applied to the elongate deployable material of sufficient magnitude to overcome the interference fit between the two components provided by the resilient element.

In one embodiment, the elongate material comprises an elongate line wound on a drum.

In such an embodiment it may be preferred that the drum is mounted to a hub or shaft by means of the resilient element.

In this embodiment, the device may comprise an anchor device having one end of the elongate material arranged to be anchored at an anchor point relative to a structure, and the other end capable of being pulled away from the anchor point to the structure.

In another embodiment according to the first aspect of the invention, the resilient element is secured relative to the first component positioned internally of the second component and arranged to be moved linearly or translationally along a contact surface of the second component when the fall or impulse event causes the interference fit to be overcome.

In this embodiment, the second component may comprise a tube.

According to a further aspect, the present invention provides an anchor device having an elongate flexible line wound on a drum having one end of the elongate material arranged to be anchored at an anchor point relative to a structure, and the other end capable of being unwound from the drum; wherein the flexible line is only capable of being unwound from the drum when a predetermined deployment force is applied to the line, and an energy absorber device acts to inhibit deployment of the line from the drum.

Preferred features will be elucidated in the claims and in the specific description of the embodiments that follow. It will be readily appreciated that preferred features of certain aspects or embodiments could be usefully incorporated in other described embodiments even if not specifically described in those terms herein.

The invention will now be further described in a specific embodiment, by way of example only, and with reference to the accompanying drawings.

BRIEF DESCRIPTION OF THE DRAWINGS

FIGS. 12A to 12 E are representations of a further alternative fall safety system in accordance with the invention, employing a tolerance ring energy absorber in accordance with the invention.

DETAILED DESCRIPTION OF THE PREFERRED EMBODIMENTS

Referring to the drawings, and initially to FIGS. 1 to 4, there is shown a fall arrest safety device 2 in accordance with the invention, which has a U shaped chassis frame body 1 having opposed chassis plates 1a 1b. 1 between the chassis plates 1a 1b is mounted a shaft 5 and a rotary drum 3 mounted to be able to rotate in unison with the shaft 5 by means of a pair of spaced tolerance rings 4 one provided at each end of the shaft 5.

Figure 5A:
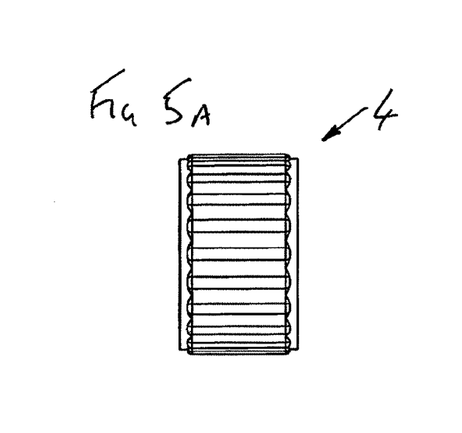
FIGS. 5A to 5C are side perspective and en views of a component (tolerance ring) of the device of FIGS. 1 to 4.
Figure 5B:
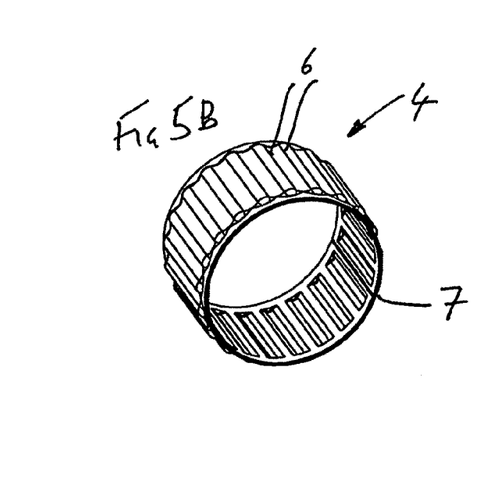
Figure 5C:
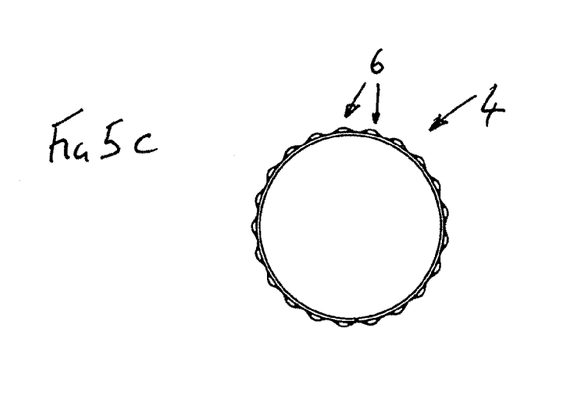
Figure 6:
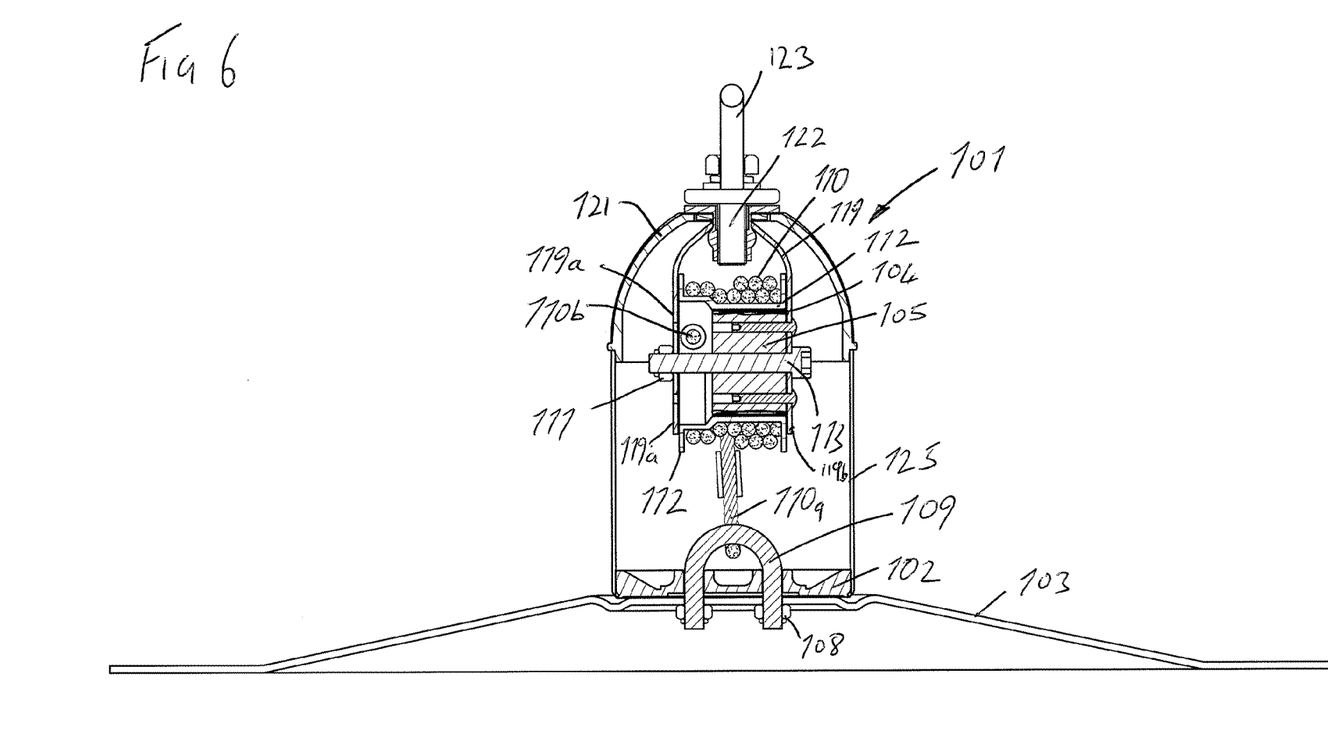
FIG. 6 is a schematic view of an alternative embodiment of safety device in accordance with the invention.
Figure 7:
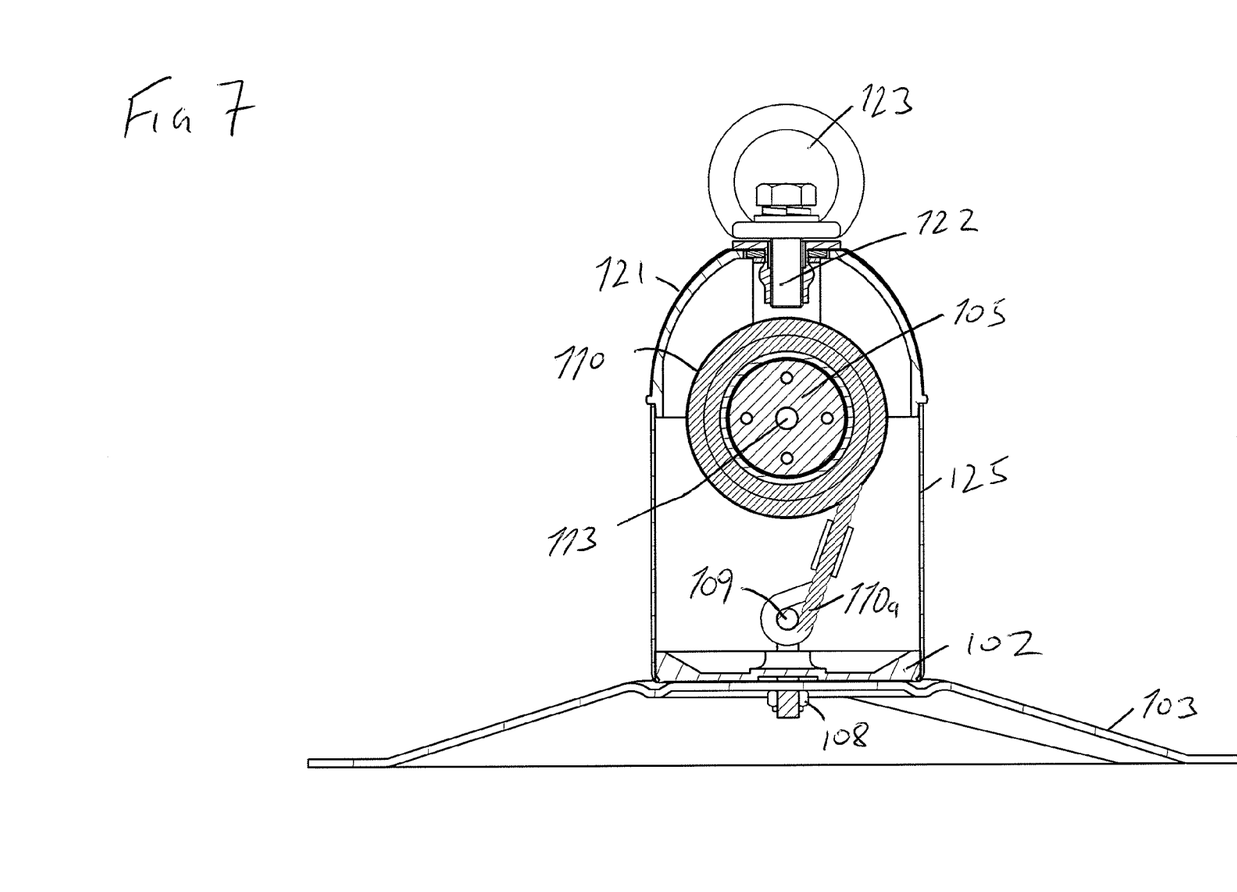
FIG. 7 is a schematic view orbited 90 degrees around the device of FIG. 6.

Typically, the tolerance rings 4 comprise respective split spring bands of resilient material, for example spring steel, the ends of which are brought towards one another to form a ring. An example of such a tolerance ring is shown in FIGS. 5A to 5C. A strip of projections 6 extends radially from the ring either outwardly from the centre of the ring, as shown (or inwardly towards the centre of the ring—in an alternative realisation). The projections 6 can be formations, possibly regular formations, such as corrugations, ridges, waves or fingers. The band thus comprises an unformed region from which the projections extend, e.g. in a radial direction. There may be two or more rows of projections. The ring is split at a zone 7. The strip of resilient material that forms the tolerance ring 4 is curved to allow the easy formation of a ring, e.g. by overlapping the ends of the spring strip or band.

In use, the tolerance rings 4 are is located in the annular space between the shaft 5 and the drum 3, such that the projections 6 are compressed between the shaft 5 and drum 3. Typically, all of the projections 6 extend either outwardly or inwardly so that one of the shaft 5 and drum 3 abuts projections and the other abuts the unformed region. Each projection 6 acts as a spring and exerts a radial force against the shaft 5 and drum 3, thereby providing an interference fit between them. Rotation of the shaft 5 or drum 3 component will produce similar rotation in the other (such that they rotate in unison) as torque is transmitted by the ring.

If torque is applied to one or both of the shaft 5 and drum 3 such that the resultant force between the components is above a threshold value, the inner and outer components can move relative to one another, i.e. the tolerance ring permits them to slip.

Additionally and importantly, the tolerance ring 4 is arranged to absorb energy in response to relative rotational movement of the shaft 5 and drum 3. This is an important aspect of the invention.

During assembly of apparatus with an interference fit between the shaft 5 and drum 3, a tolerance ring 4 is typically held stationary with respect to a first (inner or outer) component (shaft 5 or drum 3) whilst the second component (shaft 5 or drum 3) is moved into mating engagement with the first component, thereby contacting and compressing the projections of the tolerance ring 4 to provide the interference fit. Once fitted the tolerance ring 4 remains in an energised state. The amount of force required to assemble the apparatus may depend on the stiffness of the projections 6 and the degree of compression required. Likewise, the load transmitted by the tolerance ring 4 in its final position and hence the amount of retention/threshold force provided or torque that can be transmitted may also depend on the size of the compression force and the stiffness and/or configuration of the projections 6.

The safety device includes an attachment 19 for suspension from an anchor structure as is known for prior art safety block devices. A safety line (not shown) is wound on the drum.

In certain embodiments the device may include a rewinding or re-spooling mechanism which is typically positioned adjacent and connected to the rotary drum 3. Such an arrangement is shown in, for example WO2009/047541 and WO2008/007119. When a length of safety line is played out from the drum (causing rotation of the drum 3) the rewinding mechanism applies a small torque to the drum 3 causing it to contra-rotate in a direction which tends to rewind the safety line back onto the drum. One preferred type of rewinding mechanism is a coiled spring of the clockspring type. Many suitable rewinding mechanisms are known in the art and will therefore not be described in detail herein.

Also coupled to the drum at its other side is a speed responsive engagement arrangement comprising a pawl 10 and ratchet wheel 9. The pawl and ratchet arrangement may for example be of a type similar to that described in WO2008/007119. The ratchet wheel 9 is mounted for rotation with the shaft 5 by means of a bolted plate 11 and a securing nut 15 (not shown in FIG. 1) provided on an end of the shaft 5. The pawls 10 are secured to the chassis frame 1a. The pawls 10 are mounted for pivotal movement about a pivot formation 20 on the supporting chassis frame 1a. The pawls 10 can move pivotally between a first, disengaged, position, shown in FIGS. 1 and 2, in which the ratchet wheel 9 and shaft 5 are able rotate relative to the fixed chassis frame 1 and a second, engaged, position, shown FIGS. 2 and 3, where at least one of the pawls 10 is engaged with the ratchet wheel 9 so that further rotation of the ratchet wheel 9 and shaft 5 relative to the chassis structure 1 in a clockwise direction is prevented.

Figure 1:
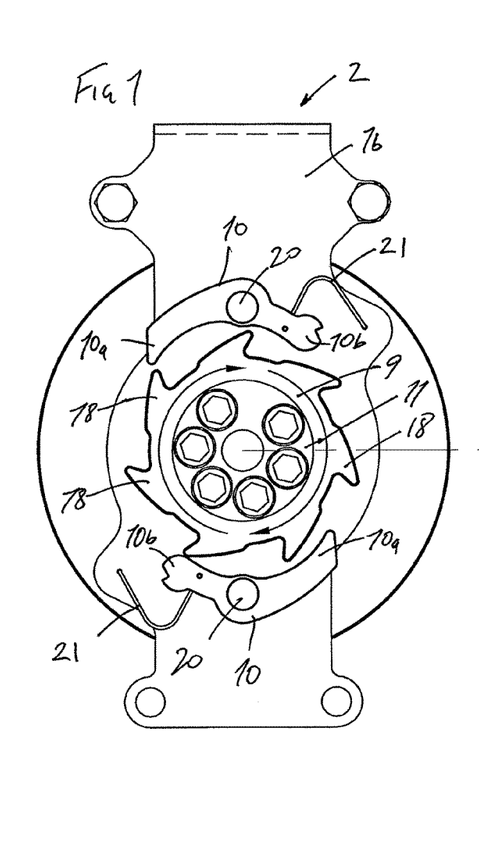
FIGS. 1 and 2 are schematic face and side views of a fall arrest safety device in accordance with the invention.
Figure 2:
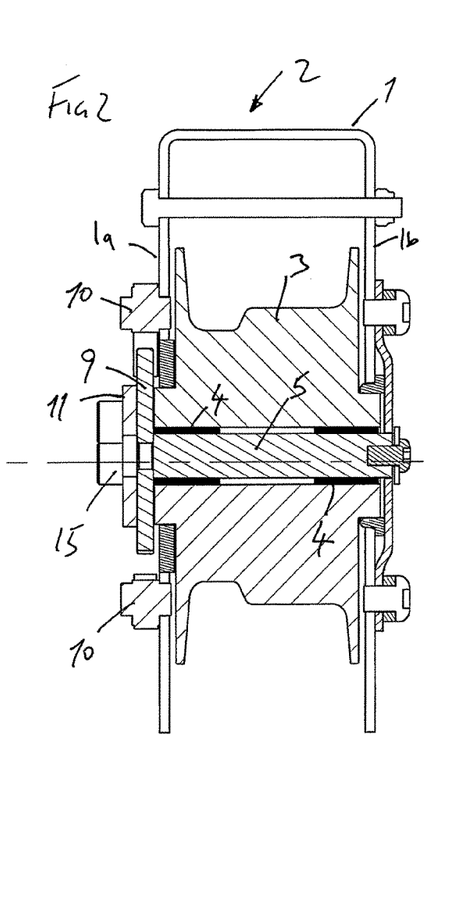

At speeds of rotation of the drum 3 below a predetermined rate the safety line is able to pay out from the drum unabated. In this regime, the ratchet wheel 9 rotates with the shaft 5 and drum 3 and the pawls 10 remain disengaged from the ratchet wheel 9 teeth formations. The pawls 10 remain fixed to the chassis. This is the situation shown in FIGS. 1 and 2. This is described in detail in WO2008/007119. Accordingly, when the drum 3, shaft 5 and the attached ratchet wheel 9 rotates clockwise (as shown in FIG. 1), each tooth 18 of the ratchet wheel 9 in turn contacts the heel end 10b of the pawl 10 and urges the second end toe end 10a of the pawl of the pawl 10 outward against the bias of the leaf spring 21. As a result, the pawl 25 follows an oscillating movement, but are not tripped to the engaged position.

Figure 3:
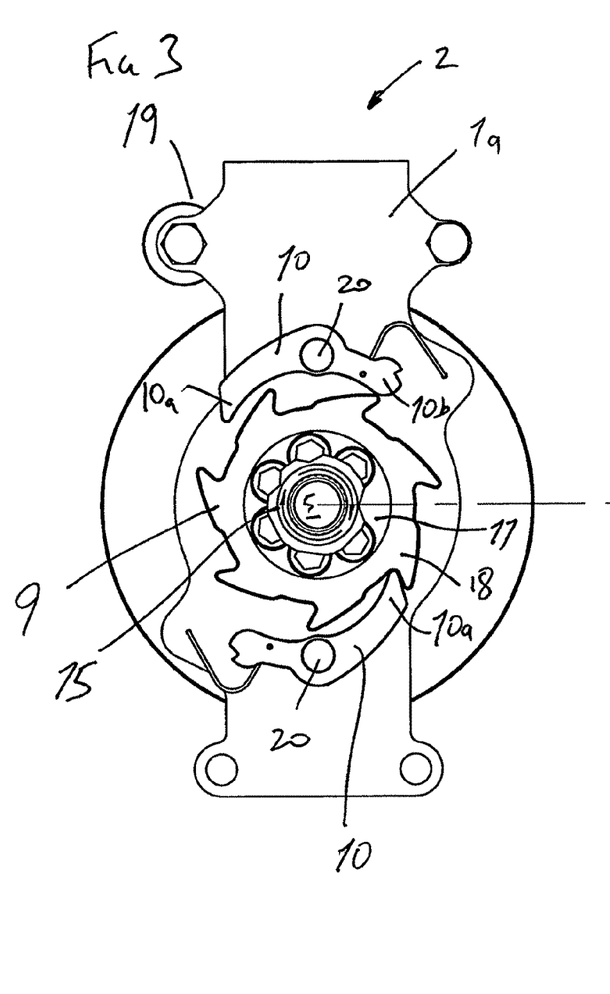
FIGS. 3 and 4 are views similar to the views of FIGS. 1 and 2 but with the device in an alternative configuration.
Figure 4:
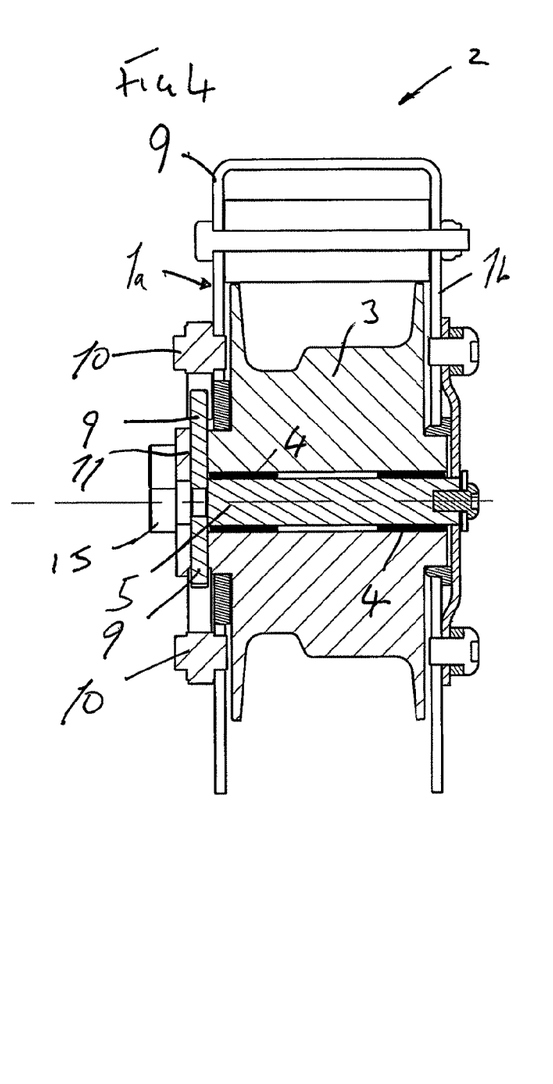

The higher the speed of rotation of the shaft 5 and ratchet wheel 9, the greater the amplitude of the oscillation of the pawl 10 will be. When the speed of clockwise rotation of the shaft 5 and ratchet wheel 9 rises to a threshold speed the amplitude of the oscillation of the pawl 10 will be sufficient to trip the pawl 10 to the engaged position as shown in FIGS. 3 and 4, bringing the toe end 10a of the pawl 25 into contact with a tooth 18 of the ratchet wheel 9, stopping further rotation of the shaft 5 and ratchet wheel 9.

This is what happens in a fall situation. The safety line pays out from the drum 3 at a higher speed than in normal 'safe' pay out situations. Upon the drum 3 rotational speed reaching the set predetermined threshold, the ratchet 9 causes the pawl 10 to kick out to a degree such that the pivotally mounted pawls 10 pivot about their pivot bosses 20 beyond a tipping point and become orientated to an engagement position in which the pawl 10 engages with the teeth of the ratchet 9. This is described in detail in WO2008/007119.

In the teeth engaged position, the shaft 5 is effectively locked to the chassis and is held against further rotation. A relative torque differential is therefore applied between the now stationary shaft 5 and the drum 3 which is continuing to tend to rotate due to the force applied by the line paying out as the user falls. If the torque is above the design threshold of the connecting tolerance ring 4 then relative rotation between the shaft 5 and the drum 3 will be permitted, however the rotation of the drum 3 will be slowed (eventually to a stop) due to the energy absorbing braking effect of the tolerance ring 4 interposed between the shaft 5 and drum 3. Depending upon the design characteristics of the tolerance ring and the shaft and drum dimensions, the pay out time to stop of the drum can be controlled to a desired result. The use of a tolerance ring to couple the shaft and drum accordingly permits relative rotation one a predetermined torque differential is reached, and also provides an energy absorbing/braking effect, because the tolerance ring remains energised and when the applied torque drops back to a lower level the further rotation of the drum is stopped (i.e. the drum 3 and shaft become re-coupled by the tolerance ring).

The invention has been primarily described with the tolerance ring 4 providing the interference fit between the shaft 5 and the drum 3. However a broader aspect the invention is considered to cover other arrangements in which this is not the case. In general terms the invention covers other arrangements of a fall arrest safety device in which a tolerance ring is used as an energy absorber arrangement irrespective of where the energy absorber is positioned. All that is required is that the resilient element provides an interference fit between a rotational component of the device and another component of the device. For example in the embodiments shown in WO2009/047541, the coiled strip absorber and the friction brake absorber could be replaced with an arrangement mounted on the end of the rotary shaft comprising a fixed brake sheath secured to the shaft by an intermediate tolerance ring.

For example an alternative safety device suitable for example for attaching between a personnel safety lanyard and an anchor point to absorb energy in the event of a fall is shown in FIGS. 12A to 12E. In the arrangement shown the safety device comprises a chassis 301 to which is mounted an energy absorber device comprising a tolerance ring 304 sandwiched between an outer rotor 303 and an inner body 305. Similarly to the earlier described embodiment, in the event of a fall that requires arrest, relative rotation between the outer rotor 303 and inner body 305 is effected causing the tolerance ring 304 to absorb the energy of the fall. In the arrangement shown operation of the energy absorber is effected by means of a double coiled actuator strip 306 which is caused to deploy as a result of the fall requiring arresting. The actuator strip 306 has a first end 306a which is in use connected to an anchor point either directly or by means of an intervening cable or line. A remote end 306b of the double coiled actuator strip is, in use, connected to a personnel fall protection lanyard. In between the opposed ends the strip 306 is wound coil form around a reduced diameter (stepped-in) portion 303a of the outer rotor 303. The actuator strip 306 intersects with the end edge of the stepped-in portion 303a of the outer rotor 303 by passing through an edge notch 321 and extending internally in the space between the stepped-in portions 303a and 305a for approximately 180° where it passes out from that space via a diametrically opposed notch 32 in the outer rotor stepped-in portion 303a.

In use, when a fall arrest event occurs, there is effectively an applied force between the ends 306a and 306b of the actuator strip 306. This causes the ends 306a and 306b to separate (move apart) under the applied load, in so doing the outer rotor 303 is caused to rotate on the inner body 305. As the rotation occurs, energy is absorbed by the energised tolerance ring 304 that is positioned between the inner body 305 and outer rotor 303. The inner body 305 is held stationary with respect to the chassis by the holding rods 307 that pass through apertures provided in the inner body. Deployment (relative rotation of the outer rotor 303 and inner body 305) either continues until the tolerance ring 304 acts to prevent further rotation or the strip 306 is deployed to its maximum extent. The strip 306 can be made of plastically deformed material such as a metallic strip and therefore provides further energy absorption due to plastic deformation. In an alternative embodiment is possible that the deployment strip 306 could be made of fabric or other flexible material.

An example of a further alternative embodiment of safety device for a fall protection system is shown in FIGS. 6 to 9. This embodiment comprises an energy absorbing anchor post 101 similar in some respects, including intended use, to the arrangement shown in EP1282460. The system is, for example, suitable for use in cable based fall arrest systems anchored to structures such as roofs. The cable needs to be held well clear of the roof surface to permit fall arrest system travellers to travel un-impeded along the cable. The casing of the post enables this to be achieved. The present invention enables a tolerance ring energy absorber to be used in place of other, more expensive energy absorbers, such as the coiled plastically deformable energy absorber as disclosed in EP1282460.

In the arrangement disclosed the anchor post comprises a mounting anchor plate 102 which is secured to a roof structure profile plate 103 by means of a U bolt 109 having securing nuts 108 threaded to respective ends of the U bolt passing through the anchor plate 102. A looped end 110 of a length of flexible metallic wound cable 110 is secured to the U bolt 109. The other end 110b of the length of cable 110 is secured to a cable drum body 111. A cable drum annulus 112 is fixed to the cable drum body and an intermediate length of the cable is wound around the cable drum annulus 112. The cable drum body 112 is positioned in abutment against an end face of a cylindrical mounting hub 105 and located by the side plates 119a 119b of a stirrup arrangement 119. A securing bolt 113 and nut 114 mounts the cable drum body 111 and the hub 105 to the stirrup arrangement 119. The stirrup arrangement 119 is secured to the upper dome cap 121 of the post and about the shaft 122 of a D ring load member 123. The safety line (not shown) passes through the D ring load member 123, and applies the impulse load to the anchor arrangement in the event of a fall event.

The drum annulus 112 is provided with an interference fit mounting onto the circumferential outer surface of the cable drum body such that the 2 components are held fast with one another. The drum annulus 112 is also provided with an interference fit mounting onto the circumferential outer surface of the hub 105, but in this instance, the interference fit is achieved by means of a tolerance ring 104 positioned between the surfaces of the two components. The applied torque required to overcome the interference fit provided by the tolerance ring 104 between the drum annulus 112 and the hub 105 is significantly less than the applied torque required to overcome the interference fit provided between the drum annulus 112 and the drum body 114.

In use, the user is clipped to a line connected to a traveller secured to the safety line passing through the D ring. In the event of a fall arrest event the safety line (not shown) passing through the D ring load member 123, applies in a sideways direction, the impulse load of the fall to the D ring 123. This initially causes the safety device 101 to begin to re-orientate from the position shown in FIGS. 6 and 7 to the position shown in FIG. 8 and then onward to the position shown in FIG. 9.

Figure 8:
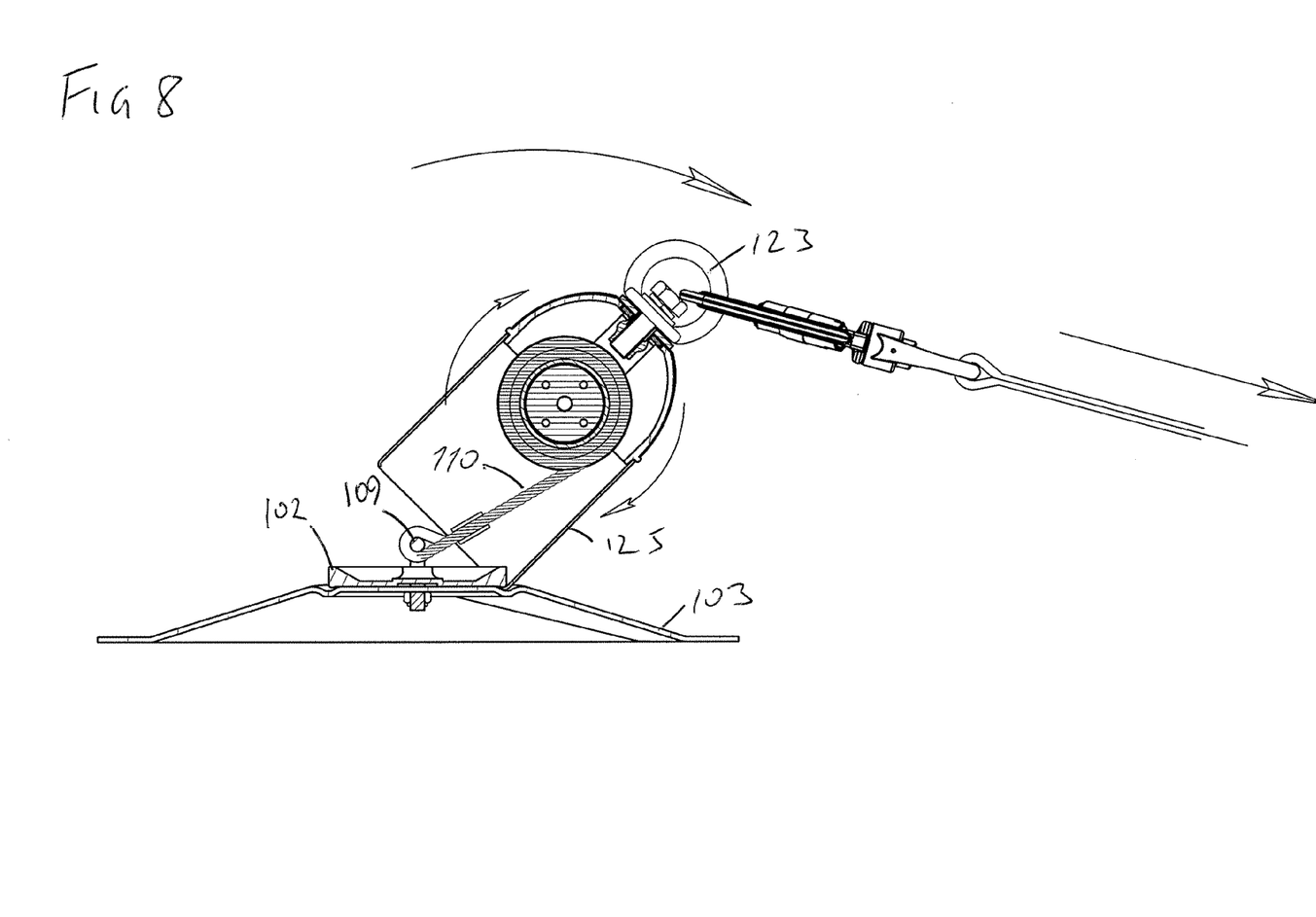
FIG. 8 is a schematic view of the device of FIGS. 6 and 7 in an initially deploying state.
Figure 9:
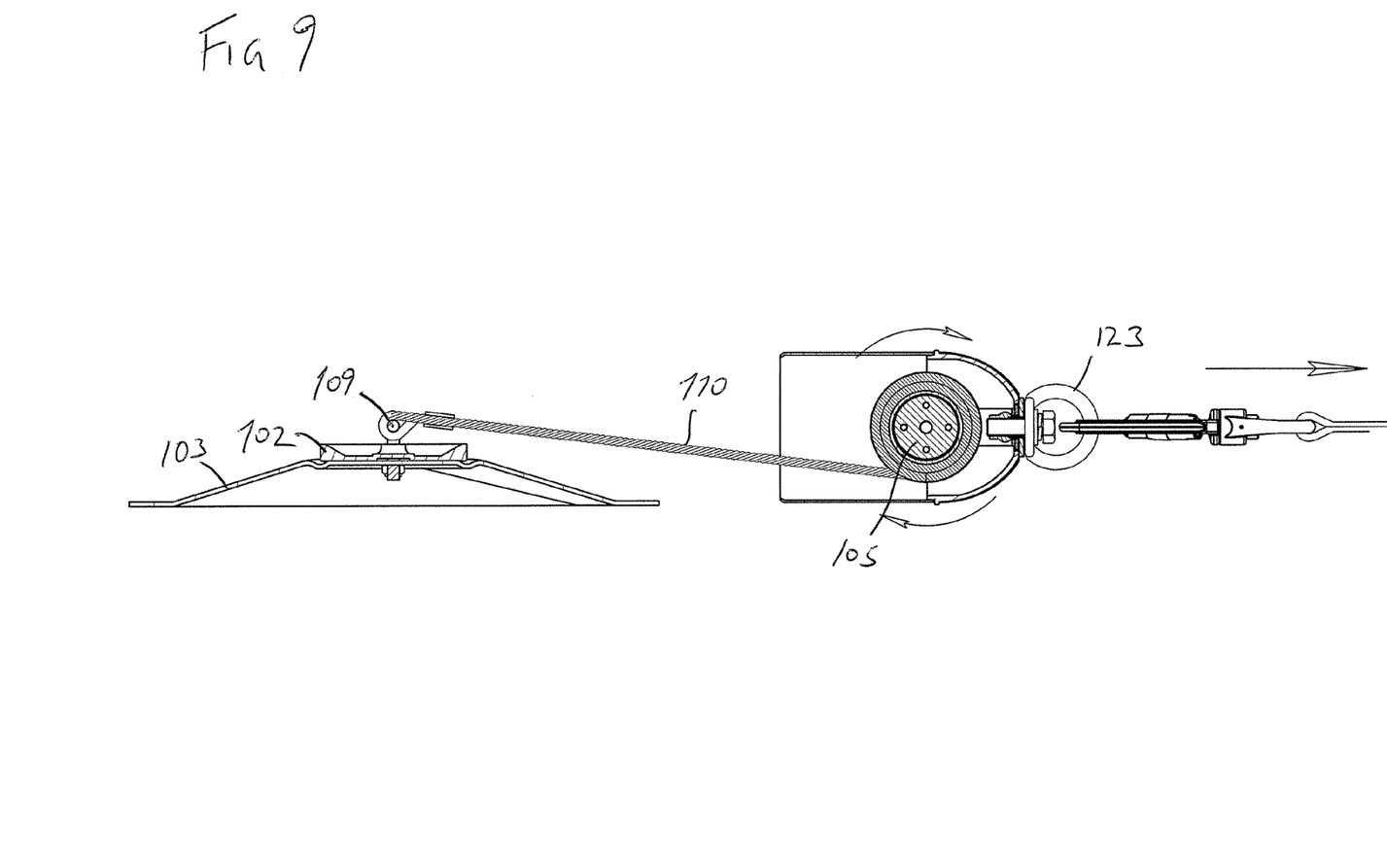
FIG. 9 is a schematic view similar to the embodiment of FIG. 8, but in an almost completely deployed state.

In the position shown in FIG. 8, the device is pulled sideways by the tension on the D ring 123. This causes the bolt 113 to move sideways away from its initial position centred over the U bolt 109. The side body casing 125 of the device tilts about its lowermost edge. The impulse loading puts the length of the cable 110 extending from the drum annulus to the U bolt 109 in tension. Providing the tension in which the cable 110 is placed is of sufficiently high magnitude, the torque applied to the drum annulus 112 will be of sufficient magnitude to overcome the interference fit provided by the tolerance ring 104 between the drum annulus 112 and the hub 105. When this occurs the drum annulus 112 rotates about the circumference of the hub 105. The drum annulus 112 and the drum body 111 rotate in unison about the axis of the bolt 113. As this happens the cable 110 stored on the drum annulus 112 pays out increasing the length of cable positioned between the drum annulus 112 and extending to the U bolt anchorage 109 to the anchor plate 102, which remains anchored to the roof profile plate 103.

Above the selected threshold torque to overcome the interference fit provided by the tolerance ring 104, relative rotation between the drum annulus 112 and the hub 105 will therefore be permitted, however the rotation of the drum annulus 112 will be slowed due to the energy absorbing braking effect of the tolerance ring 104 interposed between the drum annulus 112 and the hub 105. Depending upon the design characteristics of the tolerance ring and the drum annulus 112 and the hub 105 dimensions, the torque/deployment threshold and the energy absorbing braking effect can be controlled to a desired result. The use of a tolerance ring to couple the drum annulus 112 and the hub 105 accordingly permits relative rotation once a predetermined torque differential is reached, and also provides an energy absorbing/braking effect.

Figure 10:
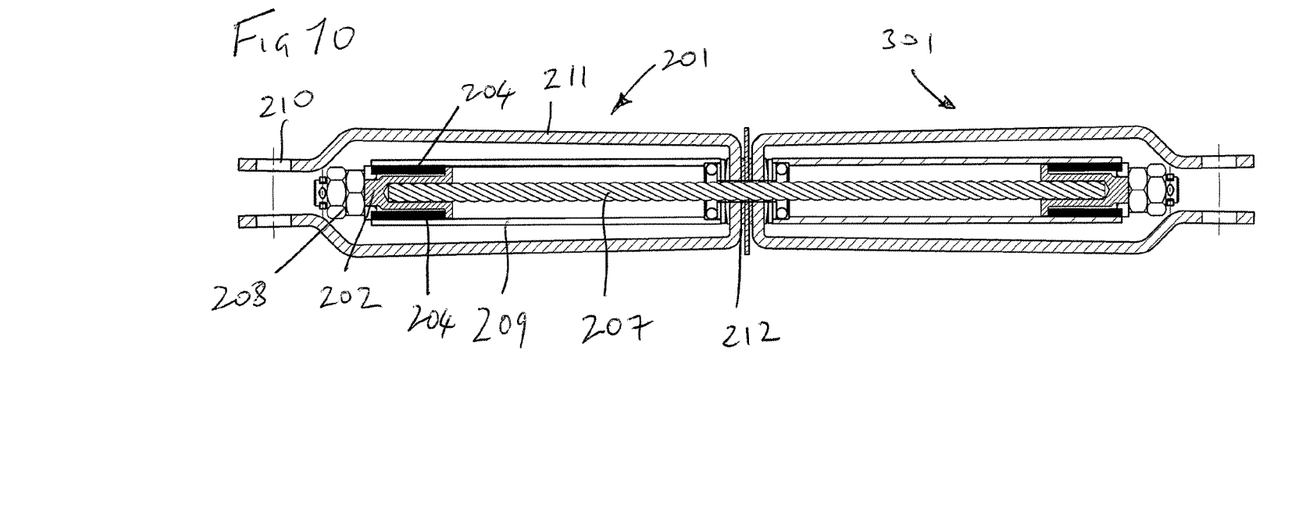
FIG. 10 is a schematic view of an alternative embodiment of safety device in accordance with the invention in an un-deployed state.
Figure 11:
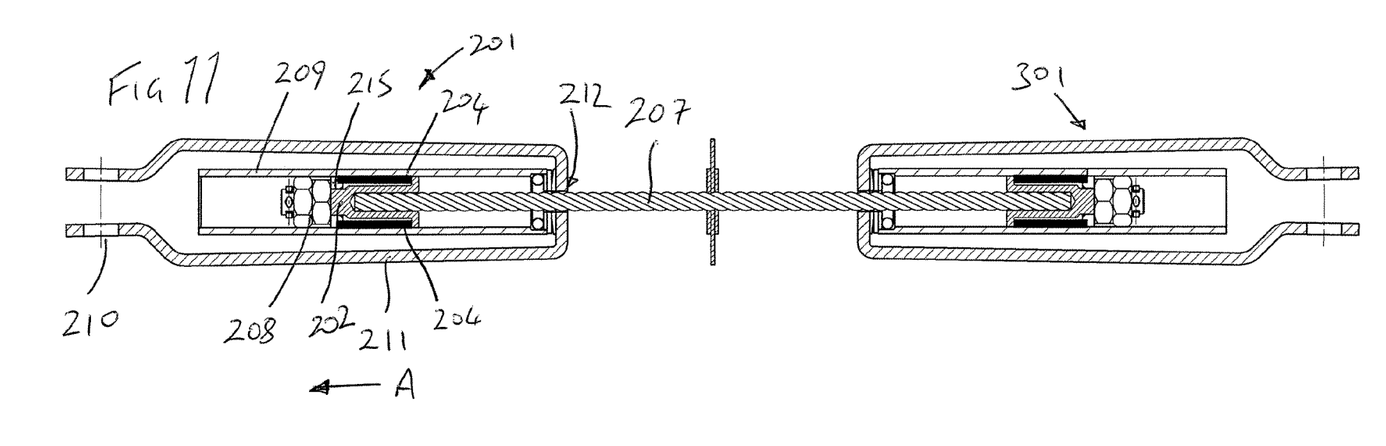
FIG. 11 is a view of the safety device of FIG. 10 in a deployed state.
Figure 12A:
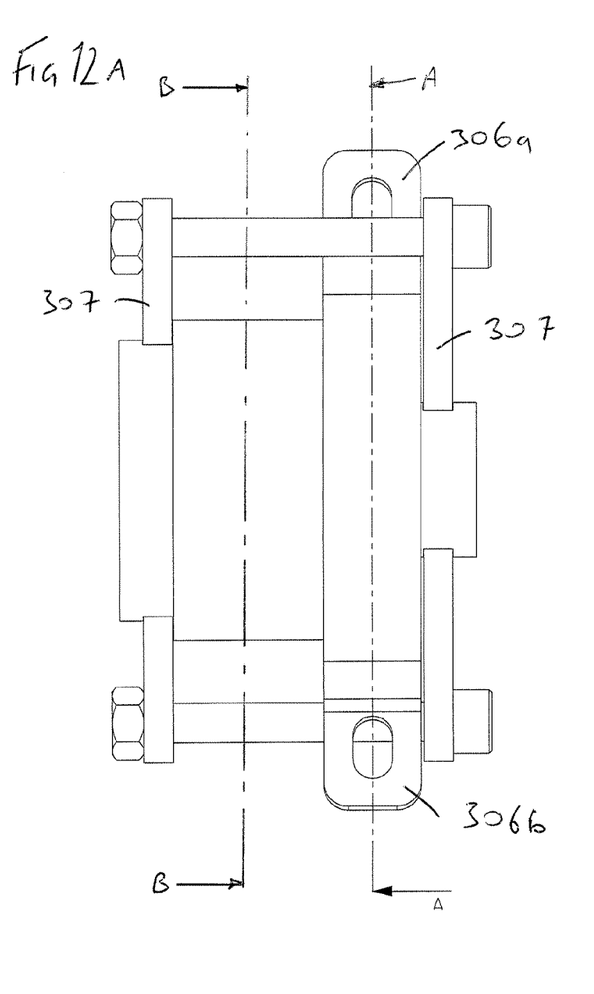
FIG. 12A is a side view.
Figure 12B:
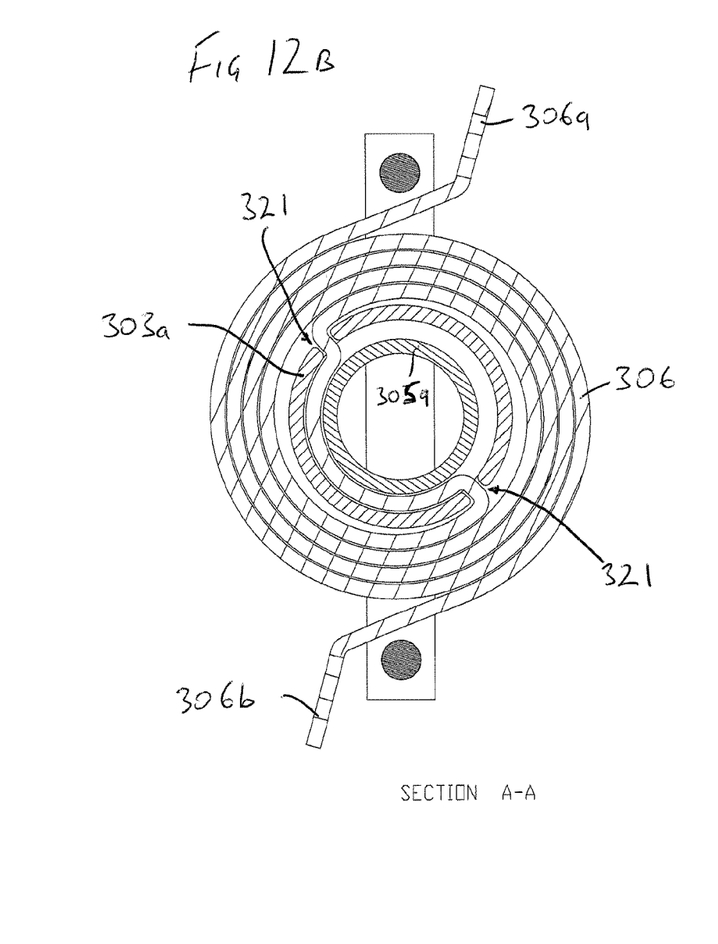
FIG. 12B is a section AA in FIG. 12A.
Figure 12C:
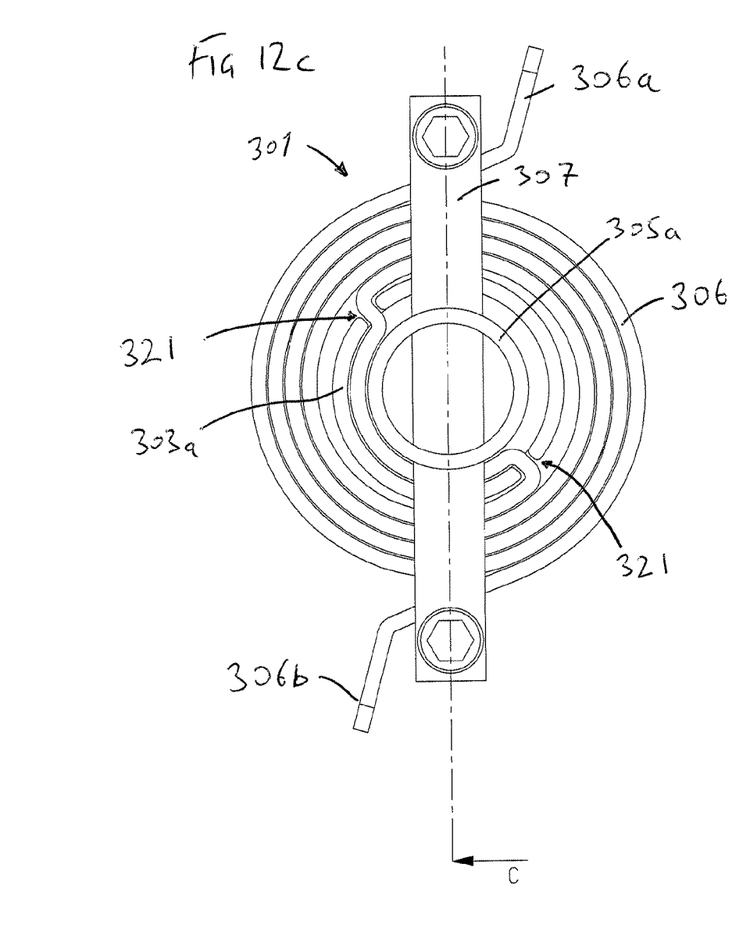
FIG. 12C is a first end view.
Figure 12D:
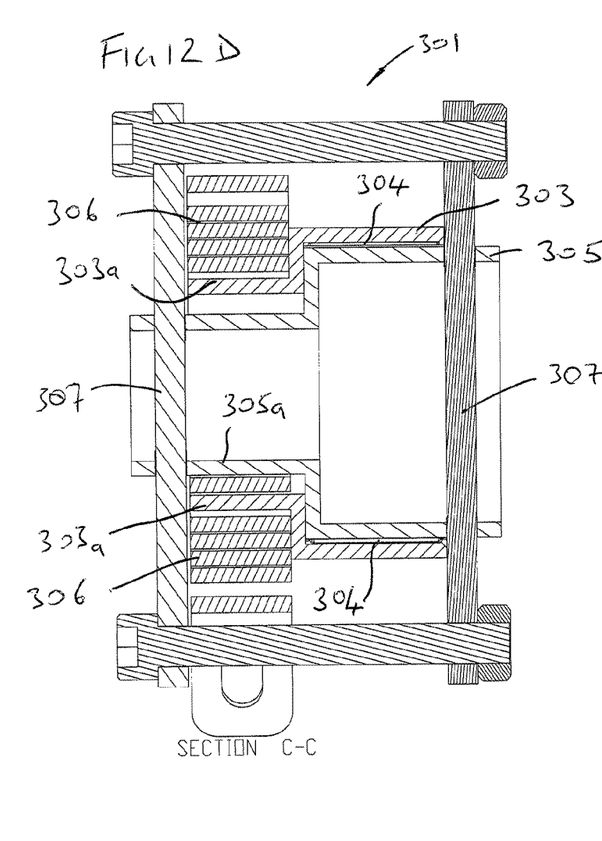
FIG. 12D is a sectional view along CC in FIG. 12A.
Figure 12E:
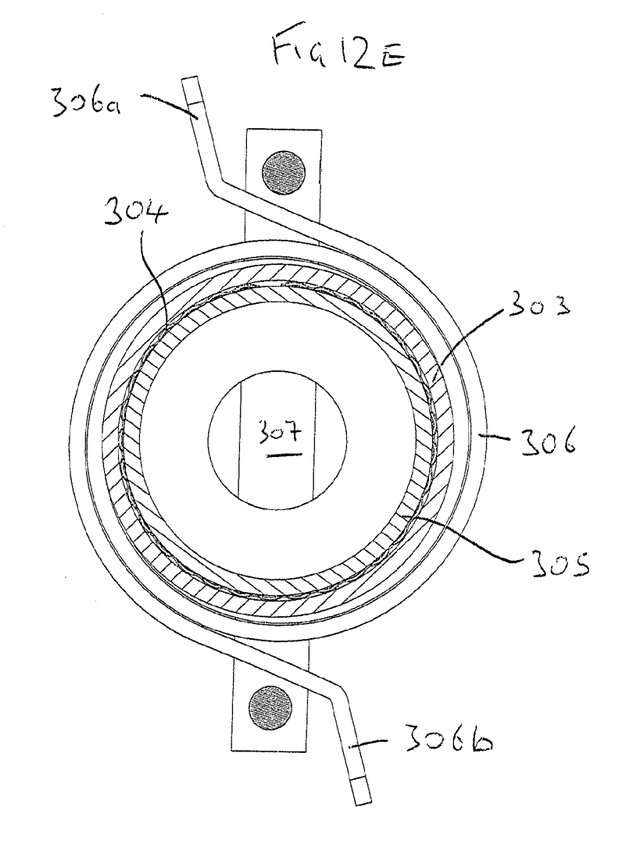
FIG. 12E is a second end view.

An example of a further alternative embodiment of safety device for a fall protection system is shown in FIGS. 10 and 11. This embodiment comprises a shock/energy absorbing device 201 similar in some respects, including intended use, to the arrangement shown in EP0605538. The system is, for example, suitable for use in a safety line system to absorb sudden impact loadings and absorb impulse or shock energy. The system utilises a tolerance ring energy absorber device as does the previous embodiments but in this instance absorbs energy as two components move translationally or linearly relative to one another rather than rotationally as in the previously described embodiments.

In the primary described embodiment in EP0605538 movement of a rod causes a retaining nut to be forced along a sleeve to permanently outwardly deform the sleeve. The plastic deformation of the sleeve absorbs the energy. According to the present invention, the energy absorption effect is achieved without plastic deformation of the sleeve byt by selecting an appropriate tolerance ring 204 to provide the interference fit between two linearly/translationally movable components.

At one end of the device 201a cable swage spigot 202 is swaged to the end of a metallic cable 207. A locking nut 208 secures a washer 215 in position to retain a tolerance ring 204 in position on the spigot 202. The cable 207 extends through a sleeve 209, which has a distal open end plugged by the assembly comprising the tolerance ring 204 mounted to the spigot 202. The tolerance 204 ring is selected to provide an interference fit with the internal circumferential surface of the tube 209 (which is coated with a lubricant). A yoke 211 is positioned to encompass the tube 209 and abut the tube at its proximal end 212, thereby enabling the yoke 211, when pulled by an attachment at its distal end 210 to move the tube in the direction of arrow A in FIG. 11, whilst the position of the cable remains fixed. In so doing the assembly comprising the tolerance ring 204 mounted to the spigot 202 is drawn into the tube 9 toward the proximal end 212.

During assembly of apparatus with an interference fit between the spigot 202 and the tube 209, the projections of the tolerance ring 204 are contacted and compressed to provide the interference fit. Once fitted the tolerance ring 204 remains in an energised state. The amount of force required to assemble the apparatus may depend on the stiffness of the projections 6 and the degree of compression required. Likewise, the load transmitted by the tolerance ring 4 in its final position and hence the amount of linear retention/threshold force provided may also depend on the size of the compression force and the stiffness and/or configuration of the projections 6.

As the assembly comprising the tolerance ring 204 mounted to the spigot 202 is drawn into the tube 209 toward the proximal end, energy is absorbed as a result of the braking effect produced by the energised tolerance ring 202 as it moves linearly along the internal surface of the tube 209.

The arrangement shown in the drawings includes a separate linear absorber 201, 301 provided at each end of the device.

FIG. 11 shows the energy absorber devices partially deployed from the initial configuration shown in FIG. 10.

What invention claimed is:

1. A safety device for use in a fall arrest or fall safety system, the safety device comprising:
an energy absorber arrangement to absorb energy in the event of a fall or other impulse event, wherein the energy absorber arrangement consists of a resilient element providing an interference fit between a rotatable shaft of the device and a safety line drum of the device, the safety line drum mounted about the shaft, wherein the resilient element is configured to permit relative rotation between the shaft and the safety line drum in a first configuration of the resilient element and to prevent relative rotation between the shaft and the safety line drum in a second configuration of the resilient element so that in the second configuration the shaft and the drum are permitted to rotate together in unison; and
a speed responsive engagement mechanism responsive to the speed of rotation of the drum, which is activated, above a predetermined rotational speed of the drum, wherein, a degree of resilience of the resilient element is such that, when the speed responsive engagement mechanism is activated, the energy absorber arrangement acts to absorb energy and slow rotation of the safety line drum by permitting relative rotation between the shaft and the drum of the device.

2. The safety device according to claim 1, wherein in the first configuration, the safety line drum and shaft rotate relative one another in response to a fall or other impulse event causing sufficient deformation of the resilient element to overcome the interference fit, wherein when the interference fit is overcome and the safety line drum and shaft rotate relative one another, the resilient element applies resistance to the relative movement thereby absorbing energy.

3. The safety device according to claim 1, further comprising means for effecting relative rotational movement between the safety line drum and the shaft in response to a fall arrest or restraint event.

4. The safety device according to claim 1, further comprising:
a re-winding mechanism to rotate the drum to re-wind the safety line onto the drum in the absence of sufficient tension in the safety line to pay out the line.

5. The safety device according to claim 1, wherein the resilient element is arranged to permit relative motion between the safety line drum and the shaft when a predetermined threshold force or torque level is applied.

6. The safety device according to claim 1, wherein the resilient element comprises a spring band.

7. The safety device according to claim 1, wherein the resilient element comprises a tolerance ring device.

8. The safety device according to claim 1, wherein the resilient element is one of a plurality of resilient elements that are provided to provide the interference fit between the shaft and the safety line drum of the device.

9. The safety device according to claim 1, wherein the resilient element comprises a plurality of radially extending projections.

10. The safety device according claim 1, wherein the resilient element is secured relative to the shaft positioned internally of the safety line drum and arranged to be moved along a contact surface of the safety line drum when the fall or impulse event causes the interference fit to be overcome.

11. A fall arrest device comprising:
a rotatable shaft;
a safety line drum mounted with the shaft for rotation;
a speed responsive engagement mechanism responsive to the speed of rotation of the drum, which is activated, above a predetermined rotational speed of the drum; and
an energy absorber arrangement configured to absorb energy and slow rotation of the safety line drum when the speed responsive engagement mechanism is activated in the event of a fall or other impulse event,
wherein the energy absorber arrangement consists of a resilient ring or band mounted to the shaft with the drum and provides an interference fit between the shaft and the safety line drum, and
wherein activation of the speed responsive engagement device causes the energy absorber arrangement to permit relative rotation between the shaft and the safety line drum, and
wherein when the speed responsive engagement device is not activated, the safety line drum rotates in unison with the shaft and without relative rotation between the safety line drum and the shaft.

* * * * *